US005242159A

United States Patent [19]

Bernstein

[11] Patent Number: 5,242,159

[45] Date of Patent: Sep. 7, 1993

[54] HYDRAULIC DOUBLE LOCK VISE

[75] Inventor: Leon M. Bernstein, Minnetonka, Minn.

[73] Assignee: Kurt Manufacturing Company, Inc., Fridley, Minn.

[21] Appl. No.: 932,774

[22] Filed: Aug. 20, 1992

[51] Int. Cl.[5] .................................. B23Q 3/08

[52] U.S. Cl. .................................. 269/32; 269/136; 269/43; 269/154; 269/292

[58] Field of Search .................. 269/43, 136, 138, 153, 269/154, 242, 906, 32, 221

[56] References Cited

U.S. PATENT DOCUMENTS

| | | | |
|---|---|---|---|
| 2,564,138 | 8/1951 | Walker . | |
| 2,683,386 | 7/1954 | Doebeli | 264/32 |
| 2,693,727 | 11/1954 | Olson | 269/32 |
| 3,397,880 | 8/1968 | Kuban . | |
| 3,484,094 | 12/1969 | Arnold | 269/32 |
| 3,861,664 | 1/1975 | Durkee . | |
| 3,927,872 | 12/1975 | Sessody | 269/32 |
| 4,223,879 | 9/1980 | Wolfe et al. . | |
| 4,529,183 | 7/1985 | Krason et al. . | |
| 4,773,636 | 9/1988 | Takahashi | 269/221 |
| 4,934,674 | 6/1990 | Bernstein . | |
| 4,939,674 | 6/1990 | Bernstein | 269/242 |
| 4,949,943 | 8/1990 | Bernstein | 269/32 |
| 5,098,073 | 3/1992 | Lenz . | |

OTHER PUBLICATIONS

Chick brochure, entitled *Hydraulics and Faceplates.*

Chick Bi-Lok Machine Company brochure, entitled *Bi-Lok Vise.*

Kurt brochure, entitled *Versatile Lock TM, The Modular Vise for Versatile Workholding.*

*Primary Examiner*—Robert C. Watson

*Attorney, Agent, or Firm*—Kinney & Lange

[57] ABSTRACT

A two-station, single action device has a body, with a fixed center block forming oppositely facing fixed jaws. At opposite ends of the body, movable jaws are moved toward and away from the fixed center block simultaneously using an actuator drive. The actuator drive has a longitudinal actuator axis and a first member joined to the first movable jaw and a second member joined to the second moveable jaw. A longitudinal power drive joined to the first and second members drives the first and second members in opposite axial directions to move the movable jaws simultaneously toward the fixed jaw. The first member and the second member further rotate about the longitudinal actuator axis in a first rotatable direction to move the movable jaws simultaneously toward the fixed jaw and rotate in a second rotatable direction to move the movable jaws simultaneously away from the fixed jaw.

20 Claims, 5 Drawing Sheets

HYDRAULIC DOUBLE LOCK VISE

BACKGROUND OF THE INVENTION

The present invention relates to a machine vise having two opposed movable jaws that will clamp two work pieces against oppositely facing surfaces of a common center-mounted fixed vise jaw. More particularly, a machine vise is disclosed having an actuator drive that rotates to displace the movable jaws toward the fixed jaw simultaneously to clamp the work pieces therebetween. The actuator drive, using fluid pressure, further displaces axially along its axis to simultaneously exert the final clamping forces on work pieces between the opposed jaw surfaces.

The concept of having a vise that has a body with a center fixed block and movable jaws that move toward this fixed block for holding work pieces has been shown in the prior art in various embodiments. For example, U.S. Pat. No. 4,934,674 discloses a two-station, single action vise. The vise has a body, a fixed center block having oppositely facing jaw plates, and movable jaws at opposite ends of the body that are moved by operation of a drive screw. The drive screw has left-hand threads for operating one of the movable jaws and right-hand threads for operating the other movable jaw. As the drive screw is rotated, both movable jaws move simultaneously toward the center block in order to clamp work pieces between facing plates of the center fixed block and the movable jaws. The drive screw and movable jaws also can be adjusted axially as an assembly with respect to the vise body to shift or adjust the movable jaws with respect to the fixed block in order to permit different sized parts to be clamped between each movable jaw and the fixed block.

SUMMARY OF THE INVENTION

The present invention relates to a machine vise that has a vise body which includes a fixed center jaw block. At opposite ends of the vise body, a pair of movable jaws are located and have jaw surfaces which face opposed surfaces of the fixed jaw block. The assembly thus forms a two-station machine vise that can securely clamp two work pieces between the opposed jaw surfaces.

An actuator drive has a longitudinal actuator axis and a first member joined to the first movable jaw and a second member joined to the second moveable jaw. A floating longitudinal power drive joined to the first and second members drives the first and second members in opposite axial directions to move the movable jaws simultaneously toward the fixed jaw.

In the embodiment as shown, the actuator drive comprises a drive screw and drive sleeve that rotate about the longitudinal actuator axis in a first rotatable direction to move the movable jaws simultaneously toward the fixed jaw and rotate in a second rotatable direction to move the movable jaws simultaneously away from the fixed jaw. The drive screw has a threaded end portion with the power drive joined to the other end of the screw. The threaded end portion of the drive screw mates with a threaded portion of the first movable jaw so that the first movable jaw is axially secure for axial displacement of the drive screw.

The drive sleeve is positioned concentrically about a portion of the drive screw. The drive sleeve has an outer surface that has threads which engage threads on an inner surface of a bore in the second movable jaw.

The drive sleeve is threadably joined to the second movable jaw so that the second movable jaw is secure for axial displacement. In addition, the drive sleeve is drivably joined to the drive screw such that the drive sleeve is rotationally driven by the drive screw during rotation of the drive screw in the first and second rotatable directions.

The floating longitudinal power drive comprises a power floating cylinder and piston drive that is joined to the drive sleeve and drive screw, respectively. When operated, the cylinder and piston are driven in opposite axial directions, which in turn drives the drive screw and the threaded drive sleeve in opposite axial directions for a limited distance with respect to the longitudinal actuator axis to simultaneously move the movable jaws toward the fixed jaw for final clamping or away therefrom in order to release the jaws.

In a further preferred embodiment, the drive screw is mounted within a support sleeve that extends beyond an end of the vise body. A thrust bearing is positioned between an end of the support sleeve and an end of the drive sleeve, which allows the drive sleeve to rotate. A clamping collar is releasably secured to a portion of the support sleeve. Selective placement of the clamping collar on the support sleeve changes the axial position of the drive screw with respect to the vise body, and, therefore, the spacing between the respective opposed jaw surfaces. The clamping collar is secured to the end of the vise body with springs located between the clamping collar and the end of the vise body. The springs allow the drive screw to shift axially slightly under spring load in order to provide a preload clamping force to one of the work pieces.

As described, the present invention provides an efficient two-station vise assembly. For instance, with work pieces located between the opposed jaw surfaces, the drive screw can be rotated in the first rotatable direction to move the movable jaws simultaneously toward the fixed jaw and clamp the work pieces therebetween. With the work pieces held between the opposed jaw surfaces, the longitudinal floating power cylinder and piston drive is operated to displace the drive screw and drive sleeve in opposite axial directions to increase the clamping forces between the opposed jaw surfaces.

A spring concentrically positioned around the drive screw is compressed when the drive screw is displaced by the longitudinal power floating cylinder and piston along the longitudinal axis. When the longitudinal power floating cylinder and piston drive is deactivated, the drive screw and drive sleeve return to their original positions in directions opposite to each other to move the movable jaws away from the center fixed jaw, thereby releasing clamping forces between the opposed jaw surfaces.

The vise assembly can be operated to rapidly clamp a succession of similar size work pieces between the opposed jaw surfaces. Under this operation, the movable jaws are positioned such that the spacing between the opposed jaw surfaces is slightly larger than the work pieces to be clamped. The longitudinal power floating cylinder and piston drive can then be operated so that the drive screw is displaced opposite to the drive sleeve and thus move both of the movable jaws toward the fixed jaw in order to clamp the work pieces therebetween.

DETAILED DESCRIPTION OF THE PREFERRED EMBODIMENTS

Figure 1:
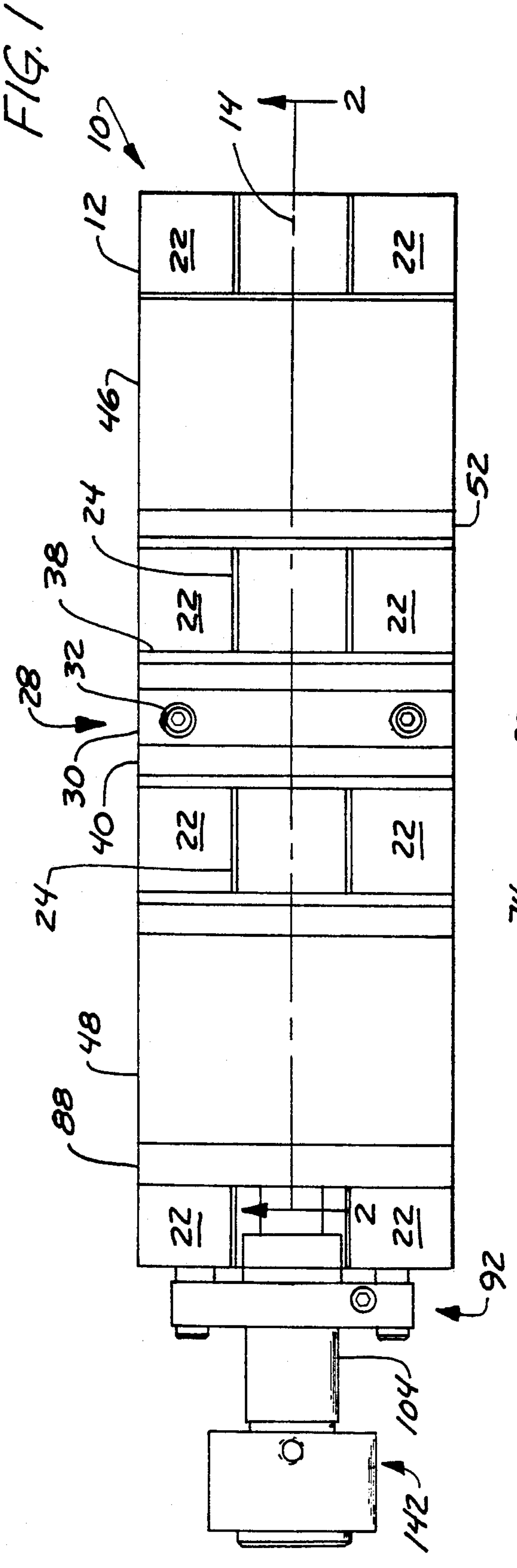
FIG. 1 is a top plan view of a vise made according to the present invention.
Figure 2:
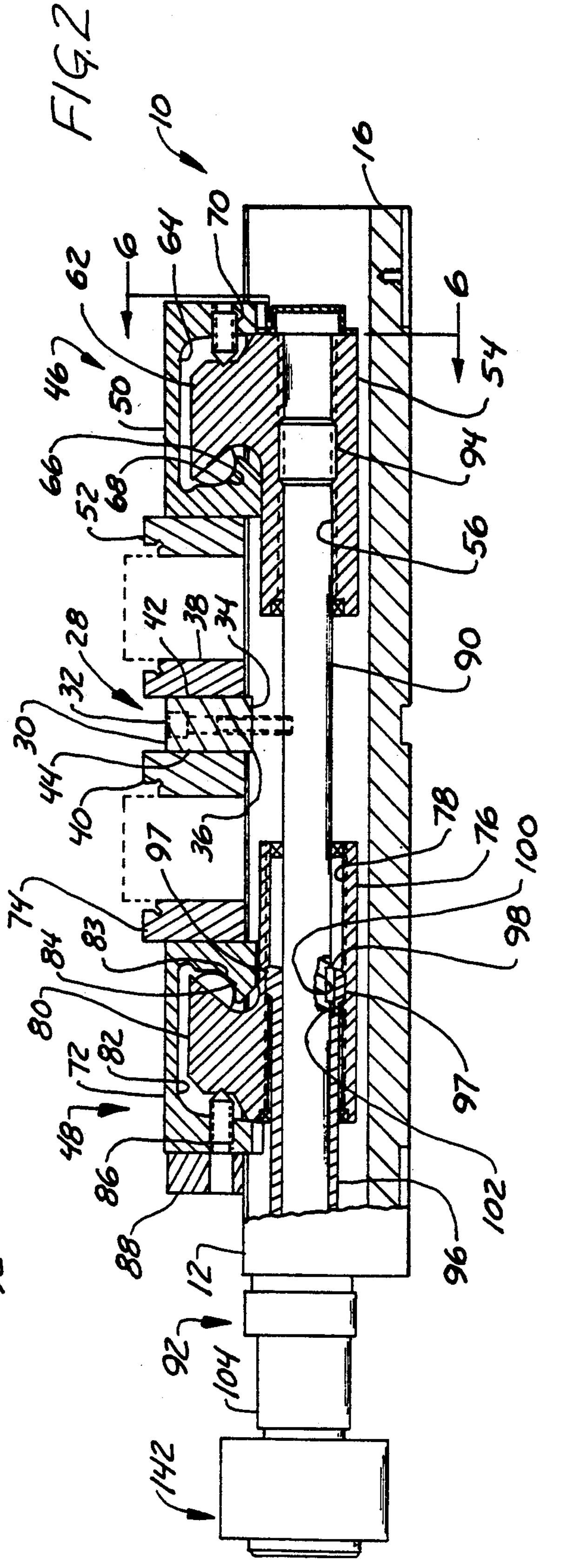
FIG. 2 is a sectional view taken as on line 2—2 in FIG. 1.
Figure 6:
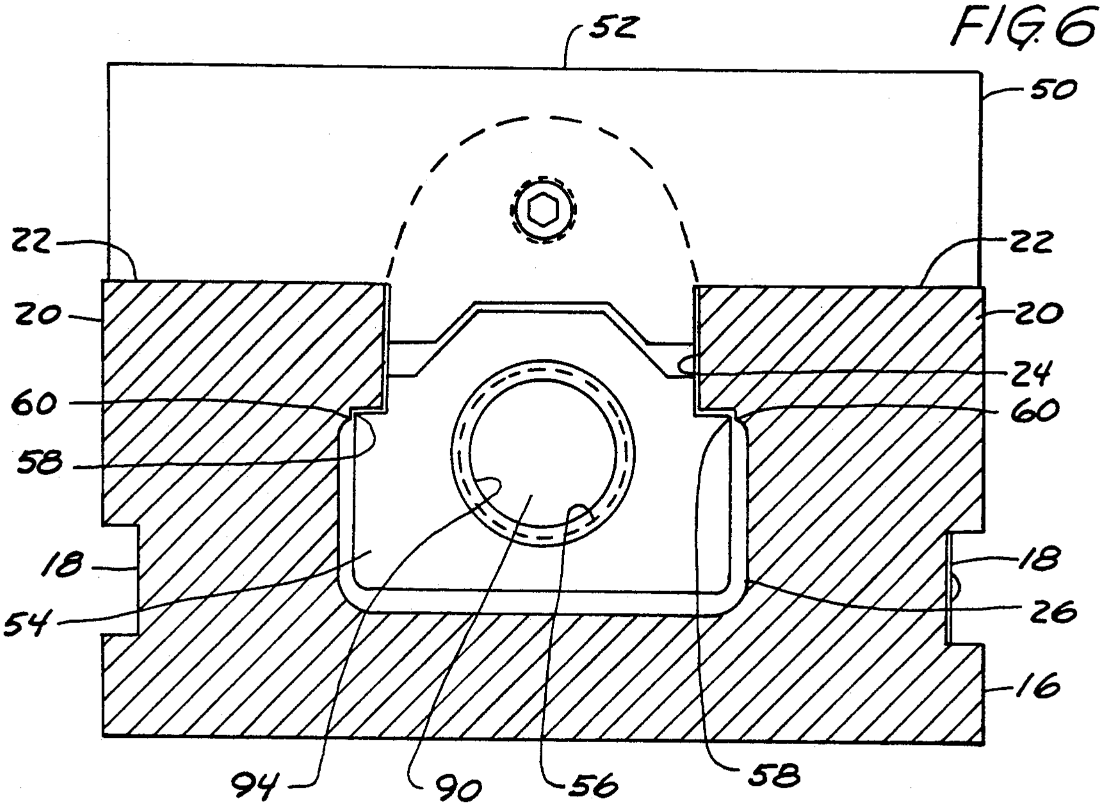
FIG. 6 is a sectional view taken as on line 6—6 in FIG. 2.

A two-station machine vise is illustrated in FIGS. 1 and 2 generally at 10 and comprises an elongated vise body 12 having a longitudinal central axis 14 and a base plate 16. Referring to FIG. 6, side walls 18 extend upwardly from the base plate 16 and extend along the length of the vise body 12. Upper rail portions 20 at the upper ends of the side walls 18 each form a top rail or way surface 22, which are spaced-apart and extend along the length of the vise body 12. The spaced-apart rail surfaces 22 form a longitudinal slot 24 that is along the longitudinal central axis 14. The spaced-apart rail surfaces 22 are generally flat and parallel to each other. The side walls 18, base plate 16 and the upper rail portions 20 further define an elongated interior channel 26 that extends along the longitudinal central axis 14.

Referring back to FIGS. 1 and 2, the rail portions 20 support a centrally-located fixed jaw assembly 28. The fixed jaw assembly 28 includes a fixed jaw block 30 that straddles the top rail surfaces 22 and is secured to the vise body 12 with threaded bolts 32 that are threaded into the upper rail portions 20. The fixed jaw block 30 has a key or lug 34 that fits into a cross groove 36 formed in the upper rail portions 20, and which extends below the rail surfaces 22. Oppositely facing fixed jaw plates 38 and 40 are attached to opposed side surfaces 42 and 44, respectively, of the fixed jaw block 30. The jaw plates 38 and 40 are removable from the fixed jaw block 30 and can thus be replaced when desired.

Two movable jaw assemblies 46 and 48 at opposite ends of the vise body 12 face or oppose jaw plates 38 and 40, respectively, of the fixed jaw assembly 28 to form two vise clamp assemblies. The first jaw assembly 46 is located at a first end of the body 12 and has a first movable jaw body or block 50. The first movable jaw body 50 supports a removable jaw plate 52 that faces the jaw plate 38 of the fixed jaw assembly 28. The jaw body 50 has a jaw nut 54 that has an internally threaded cylindrical hub or bore 56. As illustrated in FIG. 6, the body 50 is slidably guided on the rail surfaces 22, between the rail portions 20 and within the longitudinal cavity 26 with shoulders 58 that slide partially underneath opposed shoulders 60 of the upper rail portions 20. The jaw nut 54 has a head portion 62 that fits into a recess 64 in the jaw body 50 and acts to move the jaw assembly 46 through the use of a hemispherical segment 66 that is seated in a complementarily shaped seat 68. The hemispherical segment 66 is free to swivel a limited amount in its seat 68 with the head portion of the jaw nut 54 having an inclined surface that bears against the hemispherical segment 66 to transfer clamping forces to the jaw plate 52. A set screw 70 keeps the inclined surface of the head 62 in contact with the hemispherical segment 66.

The second movable jaw assembly 48 is at an end of the vise body 12 opposite from jaw assembly 46. The second movable jaw assembly 48 includes a jaw body 72 that supports a removable jaw plate 74 facing the jaw plate 40 of the fixed jaw assembly 28. The jaw body 72 has a jaw nut 76 that has an internally threaded cylindrical hub or bore 78. The body 72 is slidably guided on the rail surfaces 22 between the rail portions 20 and within the longitudinal cavity 26 with shoulders similar to nut 54 that slide underneath shoulders 60 of the upper rail portions 20. The jaw nut 76 has a head portion 80 that fits into a recess 82 in the jaw body 72 and acts to move the jaw assembly 48 through the use of a hemispherical segment 83 that is seated in a complementarily shaped seat 84. The hemispherical segment 83 is free to swivel a limited amount in its seat 84 with the head portion of the jaw nut 76 having an inclined surface that bears against the hemispherical segment 83 to transfer clamping forces to the jaw plate 74. A set screw 86 is used to keep the inclined surface of the head 80 in contact with the hemispherical segment 83. A retaining plate 88 is removably attached to body 72 on an end surface opposite jaw plate 74. The force transmitting structure described above comprising the inclined surfaces on the heads 62 and 80 bearing on the hemispherical segments 66 and 83, respectively, is well known in the field.

In the embodiment as shown, the movable jaw assemblies 46 and 48 are driven toward one another and the oppositely facing jaw plates of the fixed jaw assembly 28 with actuator means comprising a drive screw or shaft 90. The drive screw 90 has a threaded section 94 with outwardly extending threads at a remote end that threadably mate with the internal threads of the hub 56. Rotation of the drive screw 90 in a preselected direction causes the movable jaw assembly 46 to move toward the fixed jaw block 28. Conversely, counter-rotation of the drive screw 90 causes the movable jaw assembly 46 to move away from the fixed jaw block assembly 28.

Figure 7:
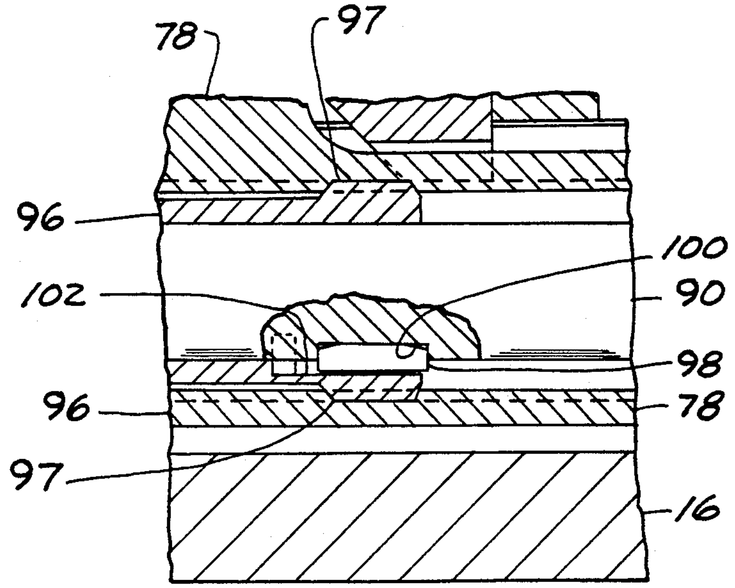
FIG. 7 is an enlarged detail sectional view of FIG. 2.

The second movable jaw assembly 48 is also displaced with a threaded drive toward and away from the fixed jaw block assembly 28 through rotation and counter-rotation, respectively, of the drive screw 90. The drive screw 90 has a drive sleeve 96 mounted thereon. The drive sleeve 96 has a threaded section 97 that has outwardly extending threads which mate with internal threads 78 on the hub of jaw nut 76. The drive sleeve 96 is slidable axially on the drive screw 90 but is rotationally driven with a key or lug 98 that slides axially in a notch or channel 102 in the drive sleeve 96 as further illustrated in FIG. 7. The width of the channel 102 perpendicular to the longitudinal length of the drive screw 90 is substantially equal to the width of the key 98. However, as illustrated in FIG. 7, the longitudinal length of the channel 102, parallel to the longitudinal length of the drive screw 90, is substantially longer than the key 98 to permit limited axial movement of the sleeve 96, while maintaining a rotational drive. The key 98 is securely positioned within a corresponding notch or key way 100 of the drive screw 90. The key 98 extends beyond the outer surface of the drive screw 90 such that the key 98 projects into the channel 102 of the drive sleeve 96. Sufficient clearance is maintained between opposed surfaces of the key 98 and the channel 102 to allow the key 98 to slide longitudinally within the channel 102 to accommodate axial sliding of the drive screw 90 relative to the sleeve 96. The key 98 and channel 102 rotationally drive the drive sleeve 96 with the drive screw 90, such that when the drive screw 90 is rotated, the drive sleeve 96 is also rotated. Alternatively, the key 98 can be securely fixed to the drive sleeve 96 and located in a suitable axial channel formed in the drive screw 90.

Figure 4:
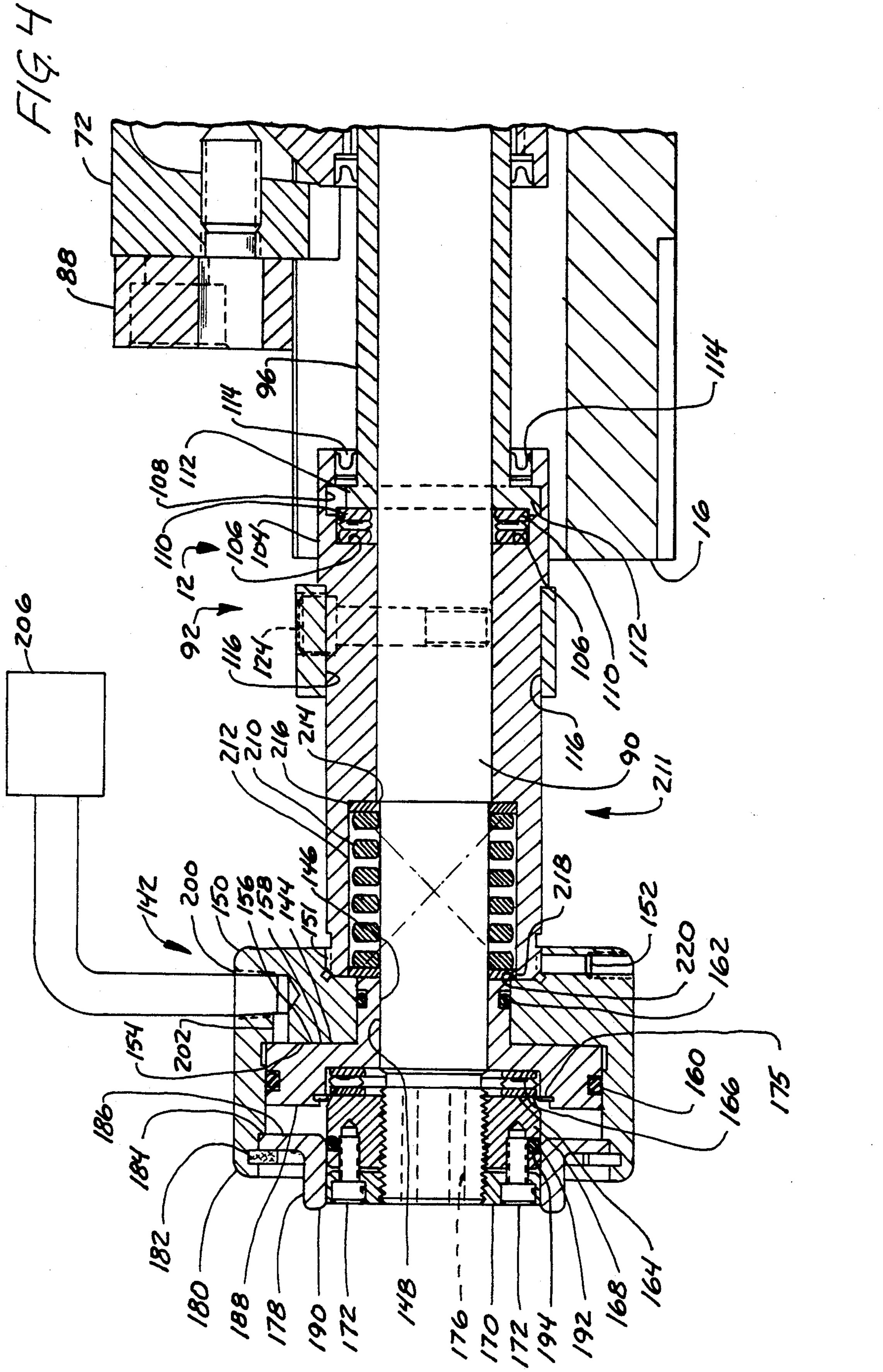
FIG. 4 is a fragmentary sectional view taken as on line 4—4 in FIG. 3.

Referring to FIG. 4, a support sleeve 104 is positioned concentrically around the drive screw 90. The support sleeve 104 and the drive sleeve 96 are coupled to move axially a limited distance along the drive screw 90. The support sleeve 104 has an inner annular support shoulder 106 formed by a recess within an end. An annular channel or groove 108 of larger diameter than the shoulder 106 is located between the support shoulder 106 and the end of the support sleeve 104. A thrust bearing 110 is positioned concentrically about the drive screw 90 and against the support shoulder 106. An eccentric flange 112 on an end of the drive sleeve 96 contacts the surface of the thrust bearing 110 opposite the shoulder 106. The flange 112 is of a size to permit insertion within the end of support sleeve 104 and into annular groove 108. The drive screw 90 holds the parts aligned so they do not become disassociated. Specifically, when the drive screw 90 is inserted into the support sleeve 104 and the drive sleeve 96, the drive screw 90 aligns the eccentric flange 112 within the annular groove 108, as illustrated, thereby preventing the drive sleeve 96 from exiting the support sleeve 104. A seal 114 protects the thrust bearing and the annular groove 108 from contamination. The thrust bearing 110 allows the drive sleeve 96 and the drive screw 90 to rotate together while the support sleeve 104 is maintained in a non-rotatable position. The thrust bearing 110 carries thrust loads from the support sleeve 104 to drive sleeve 96.

Figure 3:
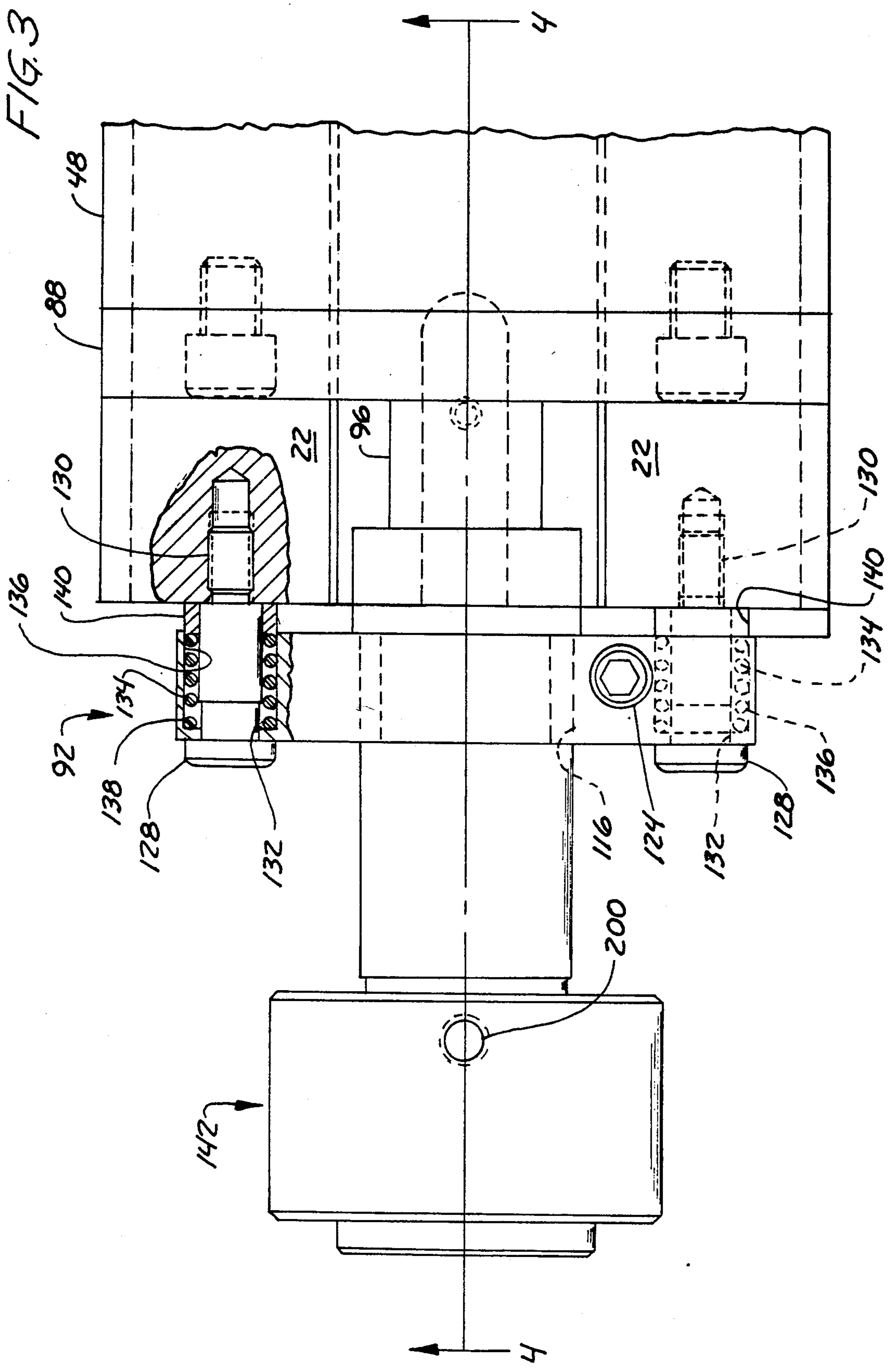
FIG. 3 is a fragmentary enlarged top plan view of the vise in FIG. 1.
Figure 5:
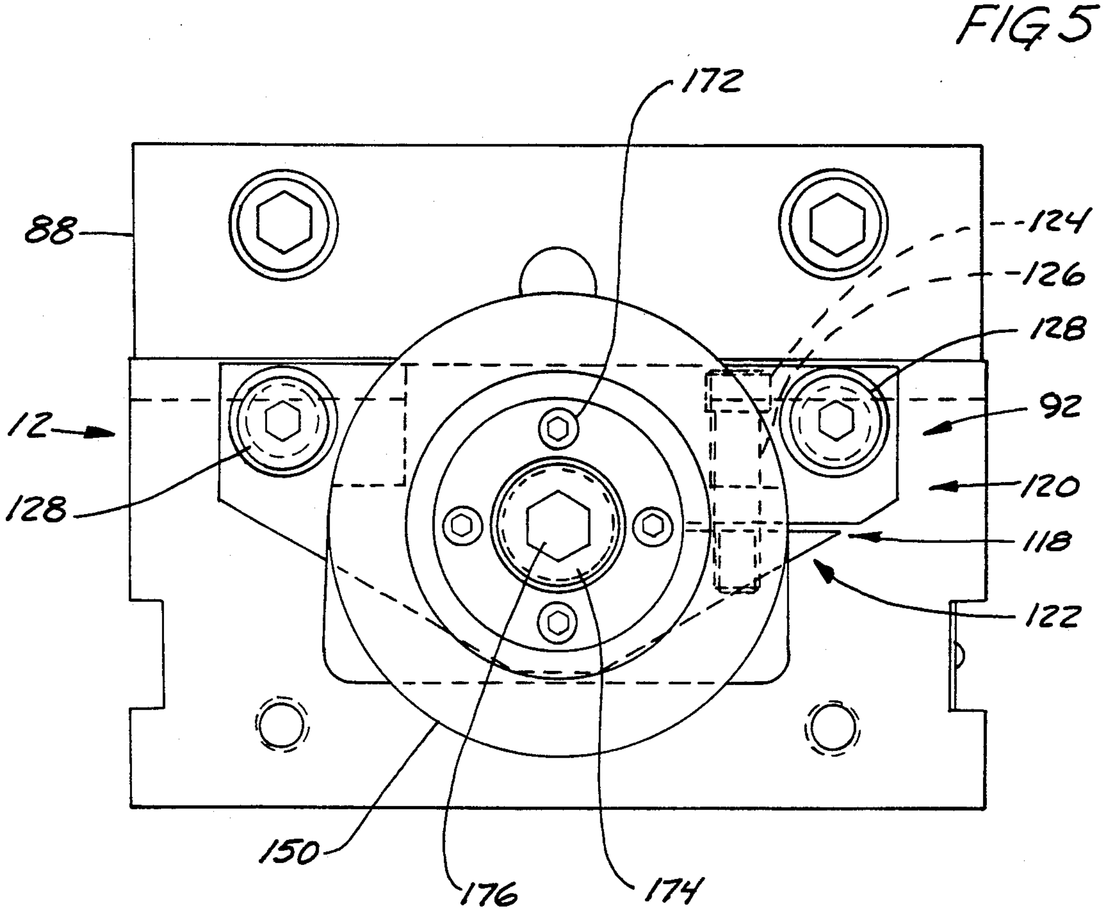
FIG. 5 is a side view of the vise in FIG. 1.

The support sleeve 104 is held from rotating and retained fixed relative to the vise body 12 with a clamping collar indicated at 92. Referring to FIGS. 3-5, the clamping collar 92 has an aperture 116 of sufficient size to allow the support sleeve 104 to be inserted therethrough. The clamping collar 92 has a slot 118 extending radially from the aperture 116 to an outer surface, thus forming a split collar having an upper clamping portion 120 and a lower clamping portion 122. A clamping bolt 124, extending through an aperture 126 in the upper clamping portion 120, the slot 118 and threaded into the lower clamping portion 122, selectively clamps the inner surfaces of aperture 116 to the outer surfaces of the support sleeve 104. The axial position of support sleeve 104 relative to the vise body 12 can thus be selected.

The clamping collar 92 is secured to the end of vise body 12 with shouldered mounting bolts 128 threadably secured into suitable apertures 130 located on an end of the upper rail portions 20. Bores 132 in the clamping collar 92 are of sufficient size to allow the clamping collar 92 to move axially along the mounting bolts 128. As illustrated in FIG. 3, a separate compression spring 134 is positioned concentrically around each mounting bolt 128 in a corresponding cylindrical spring cavity 136 within the clamping collar 92. An end of each compression spring 134 contacts an inner shoulder 138 of each spring cavity 136, while an opposite end of the spring 134 faces the end of the vise body 12. A spring bushing 140 is concentrically positioned around each mounting bolt 128 between the corresponding spring 134 and the end of the vise body 12. Each spring bushing 140 has a diameter sufficient to allow the spring bushing 140 to enter the spring cavity 136 when the springs 134 are compressed from displacement of the clamping collar 92 toward the end of the vise body 12.

Referring back to FIG. 2, selective placement of the clamping collar 92 on the support sleeves 104 varies the relative distance between each movable jaw assembly 46 and 48 and the fixed jaw assembly 28. For example, the spacing between the jaw plate 52 of the first movable jaw assembly 46 and the fixed jaw plate 38 can be increased by pushing the drive screw 90, the support sleeve 104 and drive sleeve 96, farther within the vise body 12 and securing the clamping collar 92 to an appropriate position on the support sleeve 104. When the spacing of the jaws between jaw plates 38 and 52 is increased, the spacing between the jaw plates 40 and 74 decreases by the same amount. This allows the vise assembly 10 to accommodate different width work pieces. Alternatively, the clamping collar 92 can be secured to the support sleeve 104 to make the distance between the jaw plates 40 and 74 greater than the distance between the jaw plates 38 and 52 by pulling the drive screw 90, support sleeve 104 and drive sleeve 96 out of the vise body 12. Likewise, the clamping collar 92 can be secured to the support sleeve 104 such that the spacing between each movable jaw plate 52 and 74 and the fixed jaw assembly 28 is equal to accommodate work pieces of equal width.

An axial or longitudinal floating power drive assembly 142 is located at an end of the drive screw 90 and support sleeve 104, as illustrated in FIG. 4. The axial drive assembly 142 is a power actuator comprising a cylinder and piston that includes an inner drive member (piston) 144 having an inner bore surface 146 that faces and fits over an outer surface 148 of the drive screw 90. An outer (housing) cylinder 150 is threaded on to the support sleeve 104 using engaging threads 151. A set screw 152 secures the outer cylinder 150 to the support sleeve 104. The outer housing 150 has a bore for inner drive member 144 which includes inner shoulder surface 154 that faces an outer surface 156 of the inner drive member 144 and when under pressure, forms an annular fluid pressure cavity 158 therebetween. Suitable O-ring seals 160 and 162 are provided in grooved channels of the inner drive member 144 to seal the concentric fluid pressure cavity 158. A thrust bearing 164 is positioned concentrically about the drive screw 90 on a support shoulder 166 of the inner drive member 144. The thrust bearing 164 contacts a nut 168 on a surface opposite the support shoulder 166 concentrically about the drive screw 90. The thrust bearing 164 is held in place using a lock ring 175, and threaded nuts 168 and 170. Threaded nut 168 is threaded on the end of the drive screw 90 using threads 171 to position the thrust bearing 164. The threaded nut 170 is then threaded on threads 171 to secure threaded nut 168 in place. Cap screws 172 further secure nuts 170 and 172 together. The end of the drive screw 90 has a hexagonal receiving socket 176 to accept a hex end crank or key, not shown. When the drive screw 90 is rotated, the nuts 170 and 168 also rotate, while the inner member or piston 144 remains substantially stationary due to the presence of the thrust bearing 164.

A stop ring or member 178 is secured to the outer housing 150 concentrically around the nuts 168 and 170. A locking ring disposed within an annular groove 182 in the outer housing 150 secures the stop ring 178 against a support 184 located in the outer housing 150. The stop ring 178 has a planar surface 186 substantially perpendicular to the longitudinal axis of the screw 90 and spaced from and facing opposite to a surface 188 of the inner drive member or piston 144. The space between surface 186 and 188 defines the permitted travel of piston 144. The stop ring 178 has a cylindrical flange portion 190 parallel to the longitudinal axis of the screw 90 that slidably mates with outer surfaces of the nuts 168 and 170. A suitable seal ring 192 is positioned within an annular groove 194 within the nut 168.

The drive screw 90 will move axially with respect to the drive sleeve 96, support sleeve 104 and housing 150. Axial displacement of the drive screw 90 is achieved through selective pressurization of the chamber 158. As illustrated in FIG. 4, the outer housing 150 includes a port 200 that is connected to a passageway 202, which leads to the chamber 158. The port 200 is further connected to a pressure source such as a hydraulic pump, illustrated schematically as 206 in FIG. 4. The pump 206 can be hand operated with or without a valve to permit either pressurization or relieving pressure from the chamber 158.

Pressurization of the chamber 158 with a suitable fluid from pump 206 causes the inner drive member or piston 144 to move toward the stop ring 178, which in turn causes the thrust bearing 164, nuts 168 and 170, and drive screw 90 to displace axially along the longitudinal axis of the drive screw 90. The forces are reacted through support sleeve 104 and drive sleeve 96 to jaw assembly 48 and through the drive screw 90 to jaw assembly 46. As stated above, the drive screw 90 can move axially with respect to the drive sleeve 96 due to the excess space or gap between an end surface of the notch 102 and the opposed surface of the key 98, as illustrated in FIG. 7.

The forces developed in the cavity or chamber 158 between opposed surfaces of the inner piston member 144 and the outer housing 150 are thus substantially transferred to the jaw assemblies 46 and 48 as increased clamping forces between the opposed jaw plates 38 and 52, and the opposed jaw plates 40 and 74. Increased clamping forces between the jaw plates 38 and 52 are obtained from axial displacement of the drive screw 90 outwardly from the vise body 12 pulling the jaw nut 54 toward the fixed jaw assembly 28, while increased clamping forces between jaw plates 40 and 74 are obtained from opposite axial displacement of the support sleeve 104 and drive sleeve 96 inwardly toward the vise body 12.

The floating power actuator 142 could take many forms for all that is required is two members moving in linear directions opposite to each other, each member being connected to one of the moveable jaws. For example, the floating power actuator can be an electric solenoid having a core moving relative to a coil, wherein the core is connected to one moveable jaw and the coil is connected to the other. Energization of the electric solenoid causes the core and the coil to move axially opposite to each other thus displacing the moveable jaws simultaneously toward the fixed jaw. Other floating power actuators could operate using pneumatic power.

The springs 134 in the clamping collar 92 against the vise body 12 allow a preload clamping force to be applied with jaw plates 38 and 52. With a work piece positioned between the plates 38 and 52, the drive screw 90 is rotated to move plate 52 toward plate 38 and clamp the work piece therebetween. The preload clamping force is reacted through the drive screw 90, the longitudinal drive assembly 142, the support sleeve 104 to the vise body 12 with compression of the spring 134.

Referring back to FIG. 4, axial return means indicated generally at 211 reduce the clamping forces between the opposed jaw plates 38 and 52 and the opposed jaw plates 40 and 74, and return the drive screw 90, thrust bearing 164, nuts 168 and 170 and inner drive member 144 to their unloaded positions with respect to the outer housing 150 when the fluid pressure is relieved in chamber 158. The axial return means includes a helical spring 210 concentrically positioned within a cylindrical chamber 212 of the support sleeve 104. The drive screw 90 has a support shoulder 214 that contacts a spacer ring 216 which in turn contacts an end of the spring 210. At an end opposite the support shoulder 214 of the drive screw 90, the spring 210 contacts a spacer ring 218 which in turn contacts a shoulder 220 of the outer housing 150. When the chamber 158 is selectively pressurized causing axial displacement of the drive screw 90 and associated connected elements described above to clamp a work piece, the helical spring 210 is compressed, and, upon depressurization of the chamber 158, the spring 210 expands to push the shoulder of the drive screw 90 and outer housing 150 from one another and return the drive screw 90 and associated connected elements described above to their respective unloaded positions.

In summary, the present invention provides a vise assembly that is capable of exerting clamping forces simultaneously upon two work pieces. By rotating the drive screw, the vise assembly can provide a preload, selectable clamping force to a work piece. When desired, the power actuator can be operated to displace the drive screw and drive sleeve axially opposite to each other and along the longitudinal axis to increase the clamping forces on the work pieces. Alternatively, the vise assembly can be operated to rapidly clamp a succession of similar size work pieces between the opposed jaw surfaces.

Although the present invention has been described with reference to preferred embodiments, workers skilled in the art will recognize that changes may be made in form and detail without departing from the spirit and scope of the invention.

What is claimed is:

1. A vise assembly comprising a body, the body having opposite ends, and means for guiding vise jaws thereon, the assembly further comprising:

a fixed vise jaw mounted on the body between the opposite ends, the fixed jaw having oppositely facing jaw surfaces;

a pair of movable vise jaws comprising a first movable vise jaw and a second movable vise jaw mounted on the body, each of the movable vise jaws having a jaw surface facing one of the fixed jaw surfaces, and each of the movable vise jaws being movable toward and away from the fixed jaw;

rotatable actuator means for moving the movable vise jaws, the actuator means defining an actuator axis and including a first member joined to the first movable vise jaw and a second member joined to the second moveable jaw, the first and second member being rotatable about the actuator axis wherein rotation in a first rotatable direction moves the movable jaws simultaneously toward the fixed jaw and rotation in a second rotatable direction moves the movable jaws simultaneously away from the fixed jaw, the first member and second member further being axially displaceable in opposite axial directions substantially along the actuator axis to move the movable jaws simultaneously toward the fixed jaw; and longitudinal power drive means joined to the actuator means for selectively displacing the first member and the second member in opposite axial directions.

2. The vise assembly as specified in claim 1 wherein the longitudinal power drive means comprises a piston portion joined to the first member and a housing portion joined to the second member, the piston portion and housing portion defining a selectively pressurized chamber.

3. The vise assembly as specified in claim 1 wherein the first member comprises a drive screw joined to the first movable jaw such that the first movable jaw is axially held substantially stationary relative to the drive screw during axial displacement of the drive screw.

4. The vise assembly as specified in claim 3 wherein the drive screw and the first movable jaw each include a threaded portion, the drive screw and the first movable jaw threadably joined with the threaded portions.

5. The vise assembly as specified in claim 4 and connection means for joining the second member to the drive screw such that the second member is rotationally held substantially stationary relative to the drive screw during rotation of the drive screw in the first and second rotatable directions and displaceable axially opposite to the drive screw such that the second member is axially held substantially stationary relative to the second movable jaw during axial displacement of the second member.

6. The vise assembly as specified in claim 5 wherein the second member and the second movable jaw each include a threaded portion, the second member and the second movable jaw threadably joined with the threaded portions.

7. The vise assembly as specified in claim 6 wherein the second member comprises a sleeve concentrically about a portion of the drive screw, the sleeve having an outer surface portion that has threads which threadably engage threads on an inner surface of a bore in the second movable jaw.

8. The vise assembly as specified in claim 1 and further comprising means joined to the vise body for adjustably fixing the position of the actuator means along the actuator axis with respect to the vise body.

9. The vise assembly as specified in claim 8 wherein the first member comprises a drive screw joined to the first movable jaw such that the first movable jaw is axially held substantially stationary relative to the drive screw during axial displacement of the drive screw, and wherein the means for adjustably fixing comprises clamping means joined to the vise body and releasably clamped relative to the drive screw, the clamping means being positional at different locations axially along the drive screw.

10. The vise assembly as specified in claim 2 and further comprising force loading means joined to the actuator means to apply a selected clamping force between opposed jaw surfaces of the fixed vise jaw and one of the movable vise jaws.

11. A vise assembly comprising a body, the body having opposite ends, and means for guiding vise jaws thereon, the assembly further comprising:

a fixed vise jaw mounted on the body between the opposite ends, the fixed jaw having oppositely facing jaw surfaces;

a pair of movable vise jaws comprising a first movable vise jaw and a second movable vise jaw mounted on the body, each of the movable vise jaws having a jaw surface facing one of the fixed jaw surfaces, and each of the movable vise jaws being movable toward and away from the fixed jaw, each of the movable vise jaws including an internal threaded bore, the bores being in alignment with each other and having opposite hand threads;

a drive screw having a longitudinal axis and a threaded section threadably mating with the internal threaded bore of the first movable vise jaw, wherein the first movable vise jaw will move toward the fixed jaw when the drive screw is rotated in a first rotatable direction, and move away from the fixed jaw when the drive screw is rotated in a second rotatable direction; and a drive sleeve joined to rotate with the drive screw, the drive sleeve having a threaded section threadably mating with the internal threaded bore of the second movable vise jaw, wherein the second movable vise jaw will move toward the fixed jaw when the drive screw is rotated in the first rotatable direction, and move away from the fixed jaw when the drive screw is rotated in the second direction; and longitudinal power drive means joined to the drive screw and drive sleeve for displacing the drive screw axially along the longitudinal axis opposite to the drive sleeve to simultaneously displace the movable vise jaws toward the fixed jaw for a limited distance with high forces.

12. The vise assembly as specified in claim 11 wherein the longitudinal power drive means includes return means to displace the drive screw along the longitudinal axis axially opposite to the drive sleeve to simultaneously displace the movable vise jaws away from the fixed vise jaw.

13. The vise assembly as specified in claim 11 and further comprising means for adjustably fixing the position of the drive screw along the longitudinal axis with respect to the vise body.

14. The vise assembly as specified in claim 13 wherein the means for adjustably fixing comprises clamping means joined to the vise body and releasably clamped relative to the drive screw, the clamping means being positional at different locations axially along the drive screw.

15. The vise assembly as specified in claim 11 and further comprising force loading means joined to the actuator means to apply a selected clamping force between opposed jaw surfaces of the fixed vise jaw and one of the movable vise jaws.

16. The vise assembly as specified in claim 15 wherein the force loading means is connected between the clamping means and the vise body.

17. The vise assembly as specified in claim 16 wherein the force loading means comprises at least one spring mounted between the clamping means and the vise body.

18. The vise assembly as specified in claim 5 wherein the connection means includes a key sliding relative to a notch.

19. The vise assembly as specified in claim 18 wherein the key is mounted to the drive screw.

20. The vise assembly as specified in claim 11 and a key mounted to the vise screw, the key protruding into a corresponding notch in the drive sleeve wherein the key and notch join the drive sleeve to the drive screw allowing displacement of the drive screw and drive sleeve in opposite axial directions and rotation of the drive sleeve with the drive screw.

* * * * *